July 22, 1952

A. J. BIELSKI 2,604,111

LIQUID FLOW CONTROL DEVICE

Filed Feb. 14, 1948

Inventor
ALEX J. BIELSKI

George H. Fisher
Attorney

July 22, 1952 A. J. BIELSKI 2,604,111
LIQUID FLOW CONTROL DEVICE
Filed Feb. 14, 1948 3 Sheets-Sheet 2
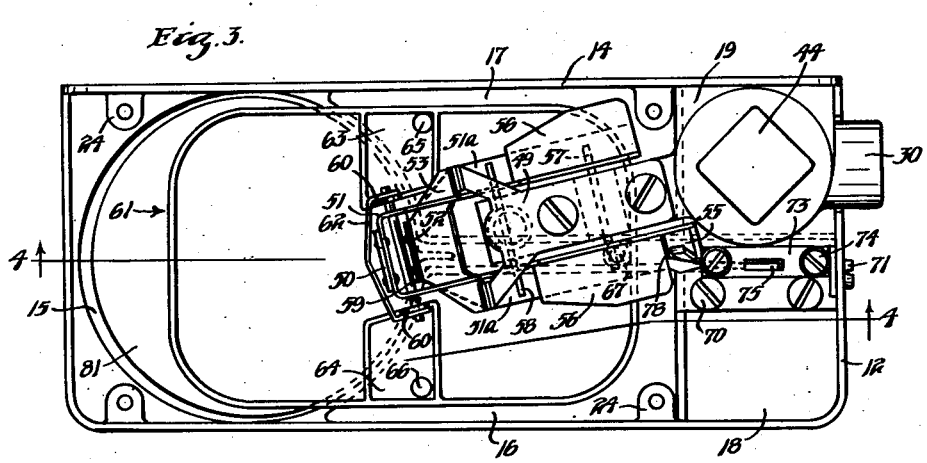
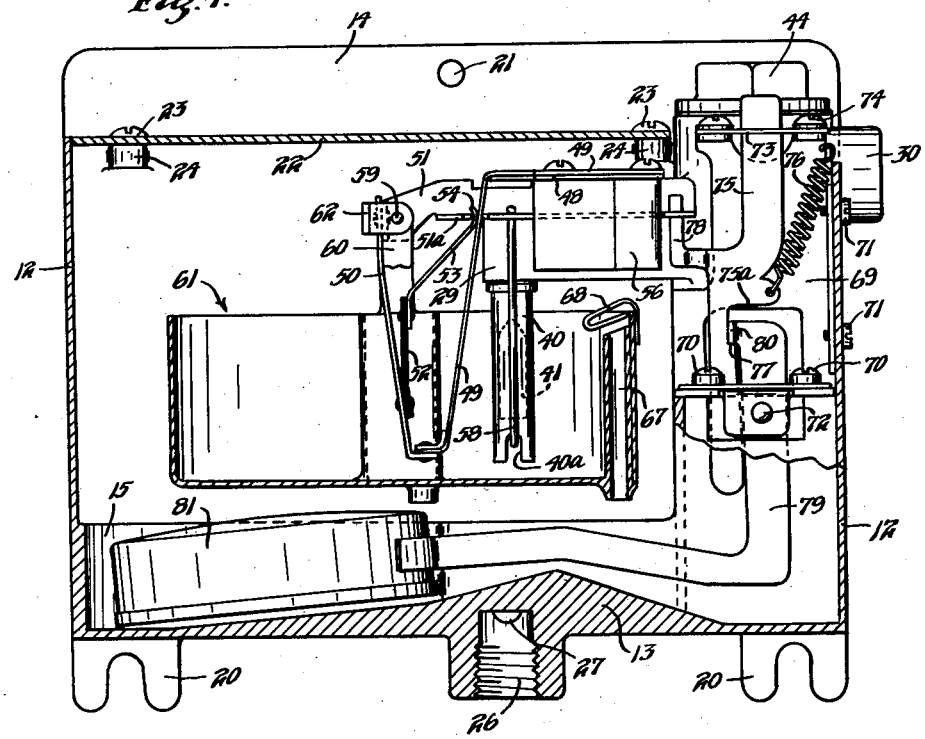
Inventor
ALEX J. BIELSKI
George H. Fisher
Attorney

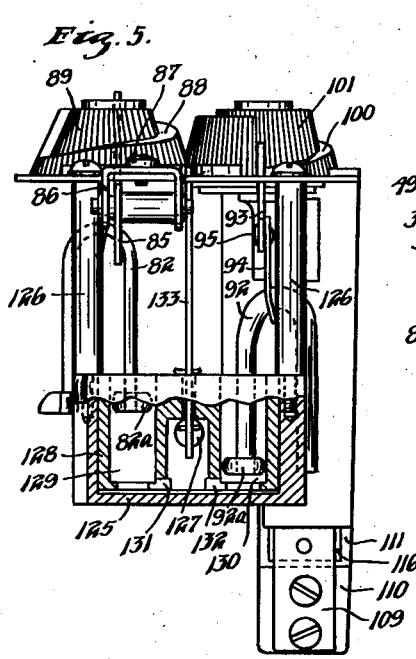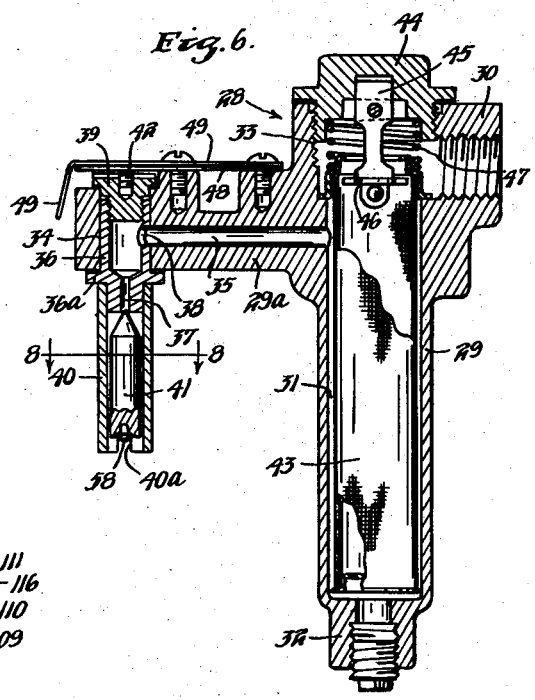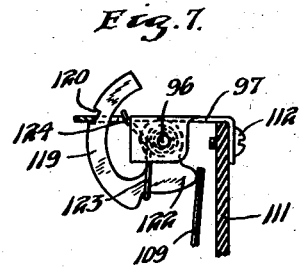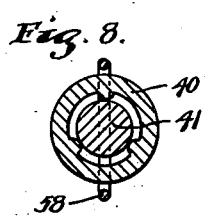

Patented July 22, 1952

2,604,111

UNITED STATES PATENT OFFICE 2,604,111

LIQUID FLOW CONTROL DEVICE

Alex J. Bielski, Minneapolis, Minn., assignor to Minneapolis-Honeywell Regulator Company, Minneapolis, Minn., a corporation of Delaware Application February 14, 1948, Serial No. 8,327

18 Claims. (Cl. 137—126)

This invention relates to an improved control device for regulating and controlling the flow of liquid. While the device may have utility in a number of fields, it is primarily intended to be used in controlling the flow of liquid fuel to a furnace.

Generally speaking, fuel flow control devices embodying some of the basic elements of this invention, such as, a constant level pan for maintaining a uniform head of oil, a siphon for feeding oil to a furnace from a constant level pan, and electrical heating means for raising and lowering a siphon, are not new in the art. Such a control device is illustrated in the co-pending application of Joseph O. Thorsheim, Serial No. 544,317, filed July 10, 1944. This co-pending aplication is now owned by the assignee of this invention.

In controls of this type any sticking of the pivoted elements of the device, and more particularly, a mechanism supporting the movable constant level pan or container, will cause the liquid level in the container to vary with a consequent variation in the rate of fuel feed.

One of the objects of this invention is to provide a control device that requires a less exacting installation than prior art devices.

Another object of the invention is to provide a control device wherein the valve actuating lever has a frictionless connection to a rigid supporting member.

Still another object of the invention is to provide a control device of the above-mentioned type wherein the constant level control valve is always bathed in oil.

A further object of the invention is to provide a device having a siphon discharge means for discharging oil from the constant level chamber into a discharge compartment positioned substantially centrally of the control device.

A still further object of the invention is to provide a latch type of manual actuator for lowering the siphon of a fuel control device and a power operator for also lowering the siphon and releasing the manual actuator to its inoperative position.

Another object of the invention is to provide a primer for the siphon or siphons of a control device of the above-mentioned type which is latchable in its priming position, but releasable to another position wherein its lifts the siphon or siphons to its or their inoperative position.

Still another object of the invention is to provide sturdy, compact and finely adjustable stop means for limiting the lowermost position of the siphon in an above-mentioned control device.

Additional objects of the invention will become apparent upon reading the following detailed description of the invention in conjunction with the accompanying drawings wherein:

Figure 3 is a plan view of the interior of the control device below the cover and top partition wall and with parts removed;

Figure 4 is a cross-sectional view taken along the line 4—4 of Figure 3;

Figure 5 is an end view of the siphons and their associated control means and priming means, with portions thereof broken away and adjacent parts removed;

Figure 6 is a cross-sectional view of the inlet filter and the constant level control valve of the control device;

Figure 7 is a cross-sectional view of the manual actuator for moving the main siphon of the control device; and Figure 8 is a cross-sectional view on line 8—8 of Figure 6 of the valve and its actuator.

Figure 1:
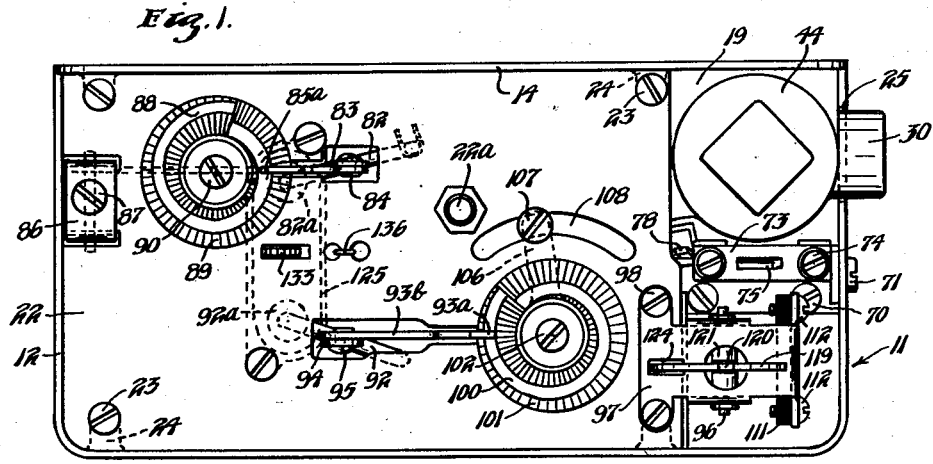
Figure 1 is a top plan view of the control device with its cover removed.
Figure 2:
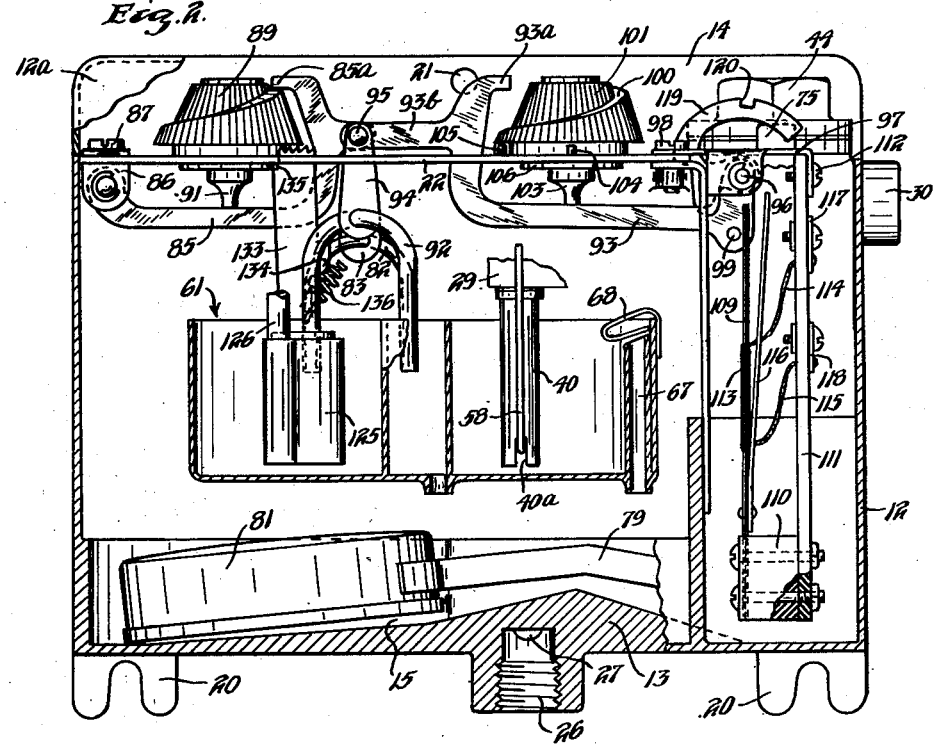
Figure 2 is a front elevational view of the control device with parts thereof broken away and parts removed.

Referring now to Figures 1 and 2 of the drawing, the main casing of the control device is generally designated by the reference numeral 11. It consists of a rectangular box-shaped casting 12 having a thick bottom portion 13 and a rear wall extension 14. As can best be seen in Figure 3, the thick bottom 13 has formed therein a pendulum-shaped chamber 15 slightly larger than a float to be described hereinafter. Discharge chambers 16 and 17 are disposed on opposite sides of the narrow portion of the chamber 15 and high walled chambers 18 and 19 are also disposed on opposite sides of the narrow portion of the chamber 15 and at the opposite end of the casing from the large portion of the chamber 15. The last mentioned chambers 18 and 19 are adapted to receive power mechanism for operating a fuel flow control means and the inlet filter and valve control means, respectively, each of which are to be described hereinafter. Bifurcated lugs 20 and opening 21, located at the bottom and top of the rear wall, respectively, are provided for ready mounting of the control device on a suitable support adjacent the furnace to be controlled by the control device. A removable partition wall 22 is secured by screws 23 to laterally extending lugs 24 formed on the side walls of the casing 11. A recess 25 in the end wall of chamber 19 is provided for the passage of a fuel inlet conduit while the bottom 13 is provided with a threaded outlet 26 and passages 27 (only one shown) establishing communication between chambers 16 and 17 and the top of outlet 26.

Figure 6 shows a part of the fuel inlet assembly generally designated by the reference numeral 28. It comprises a casting 29 having a threaded fuel inlet portion 30 communicating with a vertically extending bore 31 having a plugged lower end 32 and an enlarged threaded opening 33 at the top thereof. The bore 31 is adapted to receive a filter assembly to be described hereinafter. A laterally extending portion 29A of the casting 29 is vertically apertured at 34 and has a laterally extending passage 35 establishing communication between aperture 34 and bore 31.

Mounted in the aperture 34 is a valve unit 36 having a cup-shaped body portion. The bottom of the valve body is provided with a bore 37 forming a valve seat at the bottom thereof, and with a radially extending aperture 38 adapted to align with the passage 35 when in its assembled position. The top of the body 36 is internally threaded to receive a flanged plug 39, which when screwed into the body 36 will rigidly hold the valve unit by the clamping action of the flange on the plug 39 and a flange 36A on the body 36. A skirt member 40, secured by any suitable means to the bottom of the body 36 extends downwardly from the body 36 to form a guide for a valve 41. The valve 41 is adapted to be moved into seating engagement with the end of passage 37 by means to be described hereinafter to control the flow of fuel therethrough. Screw-threaded in a socket in the top of plug 39, is an adjustment screw 42 adapted to cooperate with valve actuating mechanism to be described hereinafter.

The filter assembly which fits in the bore 31, comprises a filter 43 sealed at its bottom and open at its top. The upper end of the filter has inwardly and outwardly extending circular flanges which serve as a bearing shoulder and a supporting shoulder, respectively. A plug 44 has a threaded lower end and an annular shoulder thereon for screw-threading into the enlarged opening 33 and sealing the opening, respectively. A link 45 is pivoted at its upper end to the plug 44 and carries at its lower end an X-shaped bearing member 46 adapted when inclined, to pass through the opening provided by the inwardly extending flange on the filter but to form a swivel connection with said inwardly extending flange when the link 45 extends axially of the filter. A spring 47 encircles the link 45 and bears against the plug 44 and the top of the filter 43 to normally hold the plug and filter separated so as to have the bearing member 46 rest on the inner surface of the inwardly extending flange. It is thus seen that when the plug, link and filter assembly is screw-threaded into the bore 31 and opening 33, the outwardly extending flange on the filter will seat first on the top edge of the bore 31 and will be held thereon by the spring 47 while permitting continued inward movement of the plug 44 until its bearing shoulder rests in sealing relationship on top of the body 29. In removing the filter for cleaning purposes, it will be readily seen that unscrewing of the plug will first take up the lost motion gap between the bearing member 46 and the inwardly extending flange and will then pull the filter outwardly with considerable force to break the filter loose from its generally sticky sealing position.

The above-mentioned filter-valve assembly 28 is suitably secured in the chamber 19 with the portion 30 extending outwardly through the opening 25 in the casing 11 and the portion 29A extending over the high partition wall between chamber 19 and 17 in a generally central direction of the control device. The securing means may take the form of a plurality of screws (not shown) extending through the rear wall of the casing 11 and into the body 29 or may be secured by any other well known type of securing means.

As can be seen in Figures 3 and 4, there is mounted on the top surface of the lateral extension 29A of the filter-valve assembly a Y-shaped plate member 48 and a flexible member 49 having the same general shape as the plate 48 but also having downwardly and inwardly converging legs extending from the ends of the legs of the Y and integrally joined at their lower ends to form a supporting means for a control lever now to be described. A second plate 48 may be provided above the member 49 to assume flexing of member 49 at the ends of the members 48. Secured to the lower end of the flexible member 49, as by means of rivets, is a rigid, generally L-shaped lever consisting of a wide vertically positioned leg 50 riveted to a generally U-shaped horizontally disposed leg 51. The leg 50 has riveted thereto a bimetal strip 52 which extends at an acute angle upwardly and away from the leg 50. Riveted to the upper end of the bimetal 52 is a generally Y-shaped rigid member 53 having curved end portions 54 adapted to bear against downwardly converging leg portions of the flexible member 49. Outwardly directed flanges 51a, extending laterally from the lower edge of the legs of the U-shaped member 51 are notched to provide for the passage of the downwardly extending legs of member 49 and the upper ends 54 of the member 53. The more centrally disposed of the flanges 51a is also notched out at 55 to receive an arm of a safety control to be described hereinafter. Mounted on these flanges 51a are two opposed counterweights 56 which are secured thereon by means of a tie bolt 57 extending from recesses in each of the counterweights through apertures in the legs of the member 51 and through a recess in the upper surface of the extension 29a. The tie bolt also serves as a brace for the member 51 and as a stop to limit the lowering of the weighted ends. A generally U-shaped yoke member 58, having a pin thereon extending upwardly from the base of the U to engage in a recess in the bottom of the valve 41 for actuation thereof, has laterally extending end portions thereof passing through apertures in the legs of the member 51 and resting on the flanges 51a. Extending through the legs of the U-shaped member 51 near the base thereof, is a pivot 59 having reduced end portions. Extending downwardly from each end of the pivot 59 are two supporting arms 60 for a constant level pan or container generally designated by the reference numeral 61. The arms are held on the end portions of the pivot 59 by means of inwardly biased apertured legs of a U-shaped spring member 62. The high coefficient of expansion part of the bimetal 52 is positioned to face the member 50 so that, as the temperature of the oil drops, a member 53 will move toward the pivot 59. This reduces the moment arm, the distance between pivot 59 and the flexure pivot, and increases the moment arm of the counterweights 56, the distance between the center of gravity of the counterweights 56 and the flexure pivot. It is thus seen that the colder the oil becomes, the greater will be the liquid or oil level in the container 61. This is necessary to assure a uniform rate of flow of the liquid irrespective of its changes in viscosity. The container or pan 61 has laterally spaced compartments 63 and 64 therein with discharge outlets 65 and 66 respectively, positioned to discharge into chambers 17 and 16 respectively. An overflow pipe 67 is positioned in container 61 directly above the narrow portion of chamber 15, for a purpose to be described hereinafter. A curled ribbon shaped member 68 is positioned slightly above a beveled upper end of the overflow pipe 67 to prevent the formation of a meniscus.

A safety device associated with the liquid level control means described above, for shutting off the flow of liquid into container 61 in the event that liquid should overflow from said container or chambers 16 and 17, consists of a latch mechanism which is float controlled. A bracket member 69 secured to walls of the casing by screws 70 and 71 has a pivot 72 riveted thereto and extending across and above the narrow portion of compartment 15. A slotted plate 73 is secured to the top of the bracket 69 by means of screws 74. Vertically slidable through the aperture in the plate 73 and alongside the bracket 69, is a manually actuable latch member 75 that is constantly biased upwardly by a tension spring 76 anchored to an upper portion of the bracket 69 and an intermediate portion of the latch member 75. One edge of the latch member is notched to provide shoulders 77 and 75a. A laterally and upwardly extending arm 78 extends through the aperture 55 in the lever 51 for holding said lever 51 in its valve closed position when the latch member 75 is in its raised position. Pivoted on the pivot 72 is a latch lever 79 having at its upper end a laterally projecting shoulder 80 adapted to engage the shoulder 77 on the latch member 75, and having at its other end a disk shaped float 81 positioned in chamber 15. When the chamber 15 is substantially empty of liquid, the float 81 will be in its lowered position with the shoulder 80 in engagement with the shoulder 77. In this position, the horizontal portion of the arm 78 is lowered away from the lever 51 permitting the lever 51 to operate under the control of the container 61.

The apparatus thus far described, provides for controlled admission of liquid fuel to a constant level container and safety means for cutting off the said flow. It will be noted from the above description that the safety control means is necessarily positioned in the casing of the control device first and that the fuel inlet and control assembly is then removably inserted as a unit downwardly into the casing and is suitably secured in position with respect to the safety control means.

The assembly for feeding fuel from the constant level container 61 is mounted on the cover plate 22 and can best be seen in Figures 1 and 2.

A small-diameter siphon 82 is pivotally supported through link 83 and pivot 84 to a hook-shaped lever 85. One end of the lever 85 is pivoted on a pivot bracket 86 suitably secured to the plate 22 by means of screw 87. The hook end 85a of the lever 85 is adapted to bear on a spiral cam surface 88 of a manually adjustable control knob 89. The knob 89 is rotatably mounted on plate 22 by means of a screw 90 passing through the plate 22 and threaded into a stop 91 which limits the upper movement of the lever 85. By rotating the knob 89 to position various portions of the cam surface 88 under the hook-shaped end 85a, the discharge end of the siphon may be raised and lowered to vary the fuel flow therethrough. Adjustable or fixed stops (not shown) may be provided for cooperation with an abutment shoulder on the underside of the knob (not shown) to limit the upper and lower limits of the cam adjustment.

A second siphon of larger diameter and having legs of substantially equal lengths, is similarly pivoted to a hooked-shape lever 93, which is parallel to but extends in the opposite direction from lever 85. The siphon 92 is connected to the pivoted lever 93 through link 94 and pivot 95 to an extension 93b on the lever 93. The other end of the lever 93 is pivoted on pivot 96 to bracket 97. The bracket 97 is secured to plate 22 by means of screw 23 and screw 98. While this bracket is shown as being separate from but secured to the plate 22, it is obvious that the plate 22 could be made an integral extension thereof. Laterally spaced from the pivot 96, is a pin 99 rigidly secured to and extending laterally from the lever 93 for engagement by a power means to be described below. The hook-shaped end 93a of the lever 93, like the end 85a, is adapted to bear on a cam surface 100 on a knob 101 similar to the knob 89. The knob 101 is likewise secured rotatably to the plate 22 by means of screw 102 screw-threaded into stop 103 which limits the uppermost position of lever 93. A fixed stop 104 is provided on the plate 22 to limit clockwise rotation of the knob 101, while an adjustable stop 105 mounted on a bell crank arm 106, pivoted around screw 102 in a recess in plate 22, is provided to limit counterclockwise rotation of the knob 101. The lever 106 is locked in its adjusted position by means of screw 107 passing through arcuate slot 108 and screw-threaded into a threaded hole in the lever 106 so as to clamp the lever 106 in its adjusted position.

Two means are provided for controlling the lowering and raising of the pivoted lever 93, for starting and stopping the flow of liquid through the siphon 92. A heat motor consisting of a bimetallic member 109 secured to an insulation block 110 and support 111, is rigidly secured to the bracket 97 by means of screws 112. A heater 113 surrounds or is otherwise positioned with respect to the bimetal 109 so as to warp the upper end of the bimetal in a clockwise direction when the heater is energized. The leads 114 and 115 are threaded through an insulation strip 116 and support member 111 and are soldered or otherwise secured to terminal members 117 and 118. Lead wires from a control circuit are adapted to pass through an aperture (not shown) in the wall of the casing adjacent the terminals 117 and 118 for connection thereto by means of screws therein. As can be seen from the drawing, clockwise movement of the upper end of bimetal member 109 will permit the siphon 92 and its associated arm 93 to lower by gravity to a position wherein end 93a bears on the cam surface 100. Deenergization of the heater 113 causes the bimetallic member 109 to move in a counterclockwise direction engaging pin 99 so as to lift the siphon 92.

To provide for operation of the liquid or fuel feeding means when there has been a power failure or when it is desirable to initiate operation thereof when the control circuit for the device does not call for its operation, a manually operable lever 119 is provided. It has an arcuate arm with a notch 120 in its outer surface, a radial arm with a sleeve bearing 121 and a cam arm 122 adapted to engage the upper end of the bimetallic member 109. The bore through the sleeve bearing 121 on the lever 119 has a diameter slightly greater than the diameter of the pivot 96 plus the depth of the notch 120. This enables a spring 123, coiled around the sleeve bearing 121 and bearing at opposite ends against the lever 119 and a shoulder on the bracket 97, to move the bearing sleeve and the notch out of engagement with the end of a slot 124 in the bracket and to return lever 119 in a clockwise direction to its inoperative position. In moving the lever 119 manually to a position shown in Figure 7, the bimetallic member 109 will be moved almost to its fully energized position with the siphon 92 lowered into engagement with the cam surface 100. In this position, the pressure exerted by bimetallic member 109 on the arm 122 is sufficient to prevent the spring 123 from kicking the arm 119 towards the right and disengaging the notch 120 from the bracket 97. However, with power resumption and the control system calling for operation of the control device, the heater 113 will cause the bimetallic member 109 to move a little further towards the right or clockwise so as to enable the spring 123 to disengage arm 119 and return it to its inoperative position. This operation is generally known in the art as automatic recycling.

Control means are also provided for initially priming the siphons and for holding the siphons in their inoperative positions regardless of the condition of the other control means for the siphons. This control means consists of a cup-shaped container 125, best seen in Figure 5, suspended from the plate 22 by means of posts 126 and so positioned that about two-thirds or more of the cup-shaped member extends below the level of the liquid in the container 61. Oppositely disposed openings 127 (one shown) in the side walls of the cup-shaped container 125 establishes communication between the interior of said container and the container 61 below the liquid level. A plunger member 128, having cylinder-like chambers 129 and 130, snugly fits in the container 125. Apertures 131 and 132 at the bottom of cylinders 129 and 130, respectively, constantly maintain communication between said cylinders and the interior of the container 125. Washer-like pistons 82a and 92a secured around the inlet ends of siphon 82 and 92 respectively, cooperate with said cylinders so that when the plunger 128 is moved rapidly downwardly into the container 125, the lower edge of the plunger 128 first cuts off or closes opening 127 and forces the liquid in the container 125 upwardly and outwardly through the siphon to prime them. In its lowermost position, the openings 127 in the side walls of the plunger are in alignment with similar openings 127 in the member 125. In the raised position of plunger 128, the openings 127 in the plunger 128 are above the upper edge of the container 125 and the lower edge of the plunger 128 is above the opening 127 in the container 125. Also, in the raised position of the plunger 128, the inlet ends of the siphon are held in no-flow position by said plunger. The plunger operating means consists of a stem 133 having an abutment shoulder 134 intermediate its ends and abutment shoulder 135 adjacent its upper edge. It is resiliently biased in an upward position by means of a spring 136 anchored at one end to plate 22 and at the other end to the stem 133 below abutment 134. The upper end extends through a slot in the plate 22 for ready manipulation while the lower end extends through the top wall of the plunger 128 and is anchored thereto by means of pins passing through apertures in the rod above and below the upper wall of plunger 128. The shoulder 135 is adapted to engage under the plate 22 to hold the plunger in its lowered position against the bias of the spring 136 while the abutment shoulder 134 limits the upward movement of the rod by the spring 136. The spring exerts a lateral pressure on the shoulder 134 tending to keep shoulder 135 under plate 22 when in its lowered position. It is thus seen that a downward movement of the stem 133 both lowers the siphon and primes the siphon to initiate fuel flow, and that a slight transverse movement of the stem 133 latches it in this position.

The liquid or fuel discharging unit is lowered as a unit into its position with the lower end of the heat motor in the chamber 18 and the plate 22 resting on the ears 24 to which it is secured by screws 23. This completes the assembly of the control device with the exception that the cover 12a having a socket member (not shown) secured to the under surface of the top wall is positioned over the controls and filter. The two ends and front wall of the cover rest on the two ends and front wall of the casing 12 while an open rear side of the cover abuts against the wall 14. The cover is held in place by a plug 22a fitting in the cover socket member.

Operation

The control device is installed for operation on an oil furnace by mounting the control device by means of screws (not shown) passing through the hole 21 and the bifurcated lugs 20 and into a suitable support adjacent the furnace. The device must be positioned so that oil will flow from chambers 16 and 17 to the furnace burner but, also, must be positioned low enough so that if an excessive amount of oil accumulates in the furnace, it will back up into chambers 16 and 17 and overflow their side walls into chamber 15 to operate the safety fuel cut-off means. The flow of oil from the device to the furnace will be through openings 27 and outlet 26 and a pipe (not shown) connected to the furnace burner. The fuel supply to the constant level container 61 will be through the filter valve assembly 28 and a fuel supply pipe (not shown) extending from a fuel supply tank to the threaded inlet 30 of the filter. Lead wires not shown are then connected to the terminals 117 and 118 to put the heater 113 in series with a room thermostat and a source of electrical power.

With the control device thus installed, the adjustment knobs 89 and 101 are rotated counterclockwise to position a low portion of the cam surfaces 88 and 100 below the ends 85a and 93a respectively. With fuel being supplied to the control device, filter 43 and valve 41 to fill container 61 to its valve closing level, the stem 133 is lowered and moved transversely to latch shoulder 135 under plate 22. This primes both siphon 82 and 92 and lowers siphon 82. This starts the flow of fuel through siphon 82, compartment 63, outlet 65, chamber 17, passage 27 and outlet 26 to the furnace. Fuel flow is then sufficient to maintain a low or pilot flame when ignited manually or by a remote control means. The size of this pilot flame may then be adjusted by means of the control knob 89.

The siphon 92, while primed, will not discharge fuel into the compartment 64 so long at it is in its raised position. This is due to the fact that the discharge end of the siphon 92 is not sufficiently below the level of the liquid in container 61 to provide the difference in head to overcome the friction of the fluid in the siphon. By manually actuating the lever 119 to the position shown in Figure 7, the siphon 92 will be lowered to cause the flow of fuel therethrough. The fuel will then flow from siphon 92 into compartment 64, through outlet 66, into chamber 16, and through the other passage 27 and outlet 26 to the furnace. This addition of a much larger rate of fuel flow to that already provided by the pilot siphon, will cause a high flame to occur in the furnace which may be regulated by adjusting the knob 101 as explained above.

With the furnace thus in operation, a room thermostat may be adjusted to call for heat so as to energize heater 113 and to release the manual control lever 119 to its inoperative position as described above. This places the control device in its normal operating condition so that when the room thermostat becomes satisfied, the heater 113 will be deenergized causing the bimetal 109 to move counterclockwise and raise the siphon 92 to its no-flow position and leaving only the pilot siphon 82 in operation.

Should an unsafe condition arise, such as the extinguishment of the pilot flame with a consequent flooding of the furnace with unburned oil, or the sticking of valve 41 in its open position causing oil to overflow through overflow pipe 67, the chamber 15 will become flooded. This will raise float 81 to disengage shoulder 80 from shoulder 77 to cause spring 76 to raise latch member 75. The member 75 will engage lever 51 with sufficient force to close said valve 41. When the unsafe condition has been removed, the member 75 may be manually moved downwardly to engage shoulder 75a with the top of shoulder 80 to force the float 81 down to the bottom of chamber 15 and thus overflow oil from chamber 15 into chambers 16 and 17. Releasing of the member 75 will then bring the lower edge of shoulder 80 against shoulder 77 to reset the safety control in its operating position. The control device will then continue to operate as before until both siphons are lifted to their inoperative upper position by either the knobs 89 and 101 or by releasing the stem 133 to its upper-most position.

As it is apparent that various modifications of the above described invention may be made without departing from the spirit thereof, it is to be understood that only the appended claims should be considered in determining the scope of the invention.

I claim as my invention:

1. A liquid flow control device comprising a movable liquid receiving container, means operable by said container for controlling the flow of liquid to said container to maintain a substantially constant mass of liquid therein, movable means for discharging liquid from said container at a rate depending upon the elevation of a discharge outlet of said means with respect to the level of said liquid, means for limiting the downward movement of said discharge means, means normally holding said discharge means in an elevated no-flow position but movable away from said discharge means to cause said discharge means to lower, and movable means engageable with said discharge means in one of its positions to hold said discharge means in its no-flow position and movable to another position to cause said discharge means to lower and to fill said discharge means with liquid.

2. A liquid flow control device comprising a liquid receiving container, means for controlling the flow of liquid to said container to maintain a substantially constant mass of liquid therein, movable means for discharging liquid from said container at a point substantially centrally of said device and at a rate depending upon the elevation of a discharge outlet of said means with respect to the level of said liquid, adjustable means for limiting the downward movement of said discharge means, and a power operated pivoted lever normally holding said discharge means in an elevated no-flow position but movable with respect to said discharge means to cause said discharge means to lower to a flow position.

3. A liquid flow control device comprising a movable liquid receiving container having a substantially centrally disposed compartment therein, means operable by said container for controlling the flow of liquid to said container to maintain a substantially constant mass of liquid therein, said compartment having a discharge opening therein, movable means for discharging liquid from said container and into said compartment at a point substantially centrally of said device and at a rate depending upon the elevation of a discharge outlet of said means with respect to the level of said liquid, means for limiting the downward movement of said discharge means, and means normally holding said discharge means in an elevated no-flow position but movable with respect to said discharge means to cause said discharge means to lower, and movable means engageable with said discharge means in one of its positions to hold said discharge means in its no-flow position and movable to another position to cause said discharge means to lower and to fill said discharge means with liquid.

4. A liquid flow control device comprising a movable constant liquid level container having a compartment therein and an overflow means below the upper edges of said container and compartment, said compartment having a discharge opening therein, valve means operable by said container to control the flow of liquid to said container, means for discharging liquid from said container into said compartment, a float chamber positioned to receive liquid issuing from said overflow means, a liquid discharge chamber adjoining said float chamber for receiving liquid directly from said discharge opening in said compartment, said liquid discharge chamber having an outlet, and float-controlled means for moving said valve means to its closed position when the float chamber contains a predetermined quantity of liquid.

5. A liquid flow control device comprising a movable constant liquid level container having a compartment and overflow means therein, said compartment having a discharge opening therein, valve means extending into said container and operable by said container to control the flow of liquid to said container, means for discharging liquid from said container into said compartment, a float chamber positioned to receive liquid issuing from said overflow means, a liquid discharge chamber adjoining said float chamber for receiving liquid directly from said discharge opening in said compartment, said liquid discharge chamber having an outlet, and float-controlled means for moving said valve means to its closed position when the float chamber contains a predetermined quantity of liquid.

6. A liquid flow control device comprising a liquid container, means to maintain the liquid level in said container substantially constant, means having a no-flow and at least one flow position for discharging liquid from said container at a rate depending upon the elevation of a discharge end of said means with respect to said liquid level, power means normally holding said discharge means in its no-flow position but movable relative to said discharge means when energized to cause said discharge means to move to its flow position, an adjustable stop cooperable with said power means for limiting the downward movement of said discharge means, and latch means biased towards an inoperative position but movable against said bias to a latched position to move and to hold said power means in a position short of the power means' normal energized position and releasable automatically upon energization of said power means.

7. A liquid flow control device comprising a liquid container, means to maintain the liquid level in said container substantially constant, means having a no-flow and at least one flow position for discharging liquid from said container at a rate depending upon the elevation of a discharge end of said means with respect to said liquid level, power means normally holding said discharge means in its no-flow position but movable relative to said discharge means when energized to cause said discharge means to move to its flow position, a stop cooperable with said power means for limiting the downward movement of said discharge means and latch means biased towards an inoperative position but movable against said bias to a latched position to move and to hold said power means in a position short of the power means' normal energized position, said latch means having lost motion means therein which causes said latch means to unlatch and to return to its inoperative position upon energization of said power mechanism.

8. A liquid flow control device comprising a liquid container, means to maintain the liquid level in said container substantially constant, means having a no-flow and at least one flow position for discharging liquid from said container at a rate depending upon the elevation of a discharge end of said means with respect to said liquid, power means normally holding said discharge means in its no-flow position but movable with respect to said discharge means when energized to cause said discharge means to move to its flow position, and latch means biased toward an inoperative position but movable against said bias to a latched position to move and to hold said power means in a position short of the power means' normal energized position, said latch means having lost motion means therein which causes said latch means to unlatch and to return to its inoperative position upon energization of said power mechanism.

9. A liquid level flow control device comprising a liquid container, means to maintain the liquid level in said container substantially constant, a first and a second means having a no-flow and at least one flow position for discharging liquid from said container at a rate depending upon the elevation of a discharge end of each of said means with respect to said liquid level, power means normally holding said first discharge means in its no-flow position but movable relative to said discharge means when energized to cause said discharge means to move to its flow position, an adjustable stop cooperable with said power means for limiting the downward movement of said discharge means, and latch means biased towards an inoperative position but movable against said bias to a latched position to move and to hold said power means in a position short of the power means' normal energized position, said latch means being releasable upon energization of said power means.

10. A liquid flow control device comprising a liquid container, means to maintain the liquid level in said container substantially constant, means having a no-flow and at least one flow position for discharging liquid from said container at a rate depending upon the elevation of a discharge end of said means with respect to said liquid, power means normally holding said discharge means in its no-flow position but movable with respect to said discharge means when energized to cause said discharge means to move to its flow position, and latch means biased towards an inoperative position but movable against said bias to a latched position to move and to hold said power means in a position short of the power means' normal energized position, said latch means having a bearing rotatable on a loose fitting pivot which causes said latch means to unlatch and to return to its inoperative position upon energization of said power means.

11. A liquid flow control device comprising a liquid container, means to maintain the liquid level in said container substantially constant, means having a no-flow and at least one flow position for discharging liquid from said container at a rate depending upon the elevation of a discharge end of said means with respect to said liquid level, power means normally holding said discharge means in its no-flow position but movable when energized to cause said discharge means to move to its flow position, a stop for limiting the downward movement of said discharge means and latch means biased towards an inoperative position but movable against said bias to a latched position to move and to hold said power means in a position short of the power means' normal energized position, said latch means having a bearing rotatable on a loose fitting pivot which causes said latch means to unlatch and to return to its inoperative position upon energization of said power means.

12. A liquid flow control device comprising a liquid container, a pivot member having a rigid leg and a flexible leg joined at their lower ends and a bimetallic member mounted on said rigid leg with a free portion thereof bearing against said flexible leg, said flexible leg being rigidly fixed at its upper end, a lever having one end fixed to said upper end of said rigid leg and a free end extending towards and beyond said flexible leg, said container being pivoted on said lever adjacent the upper end of said rigid leg, means for counterbalancing said container, valve means positioned to discharge liquid into said container and connected to said lever for actuation thereby to closed position when said container is filled to a predetermined level, and means for discharging liquid from said container.

13. A liquid flow control device comprising a liquid container, a pivot member having a rigid leg and a flexible leg joined at their lower ends and a member mounted on said rigid leg and having a free portion thereof bearing against said flexible leg, said flexible leg being rigidly fixed at its upper end, a lever having one end fixed to said upper end of said rigid leg and a free end extending towards and beyond said flexible leg, said container being pivoted on said lever adjacent the upper end of said rigid leg, means for counterbalancing said container, valve means having a liquid retaining skirt surrounding it positioned to extend into and to discharge liquid into said container and connected to said lever for actuation thereby to closed position when said container is filled to a predetermined level, and means for discharging liquid from said container.

14. A liquid flow control device comprising a liquid container, means for maintaining a substantially constant level of liquid in said container, first and second movable siphons having flow and no-flow positions for discharging liquid from said container, first and second stops for limiting downward movement of said siphons, means normally urging said first siphon to its no-flow position but movable to cause said first siphon to move to its flow position, and priming means for said siphons normally biased to a position wherein it lifts said first and second siphons to their no-flow positions but movable to a position wherein it primes both of said siphons, lowers said second siphon into engagement with said second stop and frees said first siphon for movement into engagement with said first stop.

15. A liquid flow control device comprising a liquid container, means for maintaining a substantially constant level of liquid in said container, first and second movable siphons having flow and no-flow positions for discharging liquid from said container, power means normally urging said first siphon to its no-flow position but movable to cause said first siphon to move to its flow position, latch means for moving and holding said power means in a partially energized position when power is unavailable but releasable upon power resumption, and priming means for said siphons normally biased to a position wherein it lifts said first and second siphons to their no-flow positions but movable to a position wherein it primes both of said siphons, lowers said second siphon to its flow position and frees said first siphon for movement to its flow position.

16. A liquid flow control device comprising a liquid container of the constant liquid level type; a siphon for discharging liquid from said container; means for varying the elevation of said siphon; and priming means for said siphon comprising a chamber rigidly held in said container and having an inlet below the liquid level in said container, an upwardly biased plunger having a portion thereof slidable on and surrounding one leg of said siphon and slidable within said chamber, said plunger in its normal position holding said siphon in its elevated position but being movable to a lower position to prime said siphon and to transfer the control of said siphon to its elevation varying means.

17. A liquid flow control device comprising a constant level liquid chamber, means controlling the flow of liquid to said chamber, a conduit for discharging liquid from said chamber having a raised no flow position and a lowered flow position, a lever pivoted at one of its ends to a rigid support in said control device and pivoted at its other end to said conduit for raising and lowering it, an abutment extending from said lever, a rotatable cam stop positioned to cooperate with said abutment to limit the lowering of said conduit, an arm extending laterally from said lever, power means normally bearing against said arm to hold said conduit in its raised position when deenergized but movable when energized away from said arm to cause lowering of said conduit, and automatically releasable latch means for manually moving said power means to a position short of its fully energized position, said latch means being releasable to its inoperating position upon full energization of said power means.

18. A liquid flow control device comprising a constant level liquid chamber, means controlling the flow of liquid to said chamber, a conduit for discharging liquid from said chamber, a lever pivoted at one of its ends to a rigid support in said control device and pivoted at its other end to said conduit for raising and lowering it, an abutment extending from said lever, a rotatable cam stop positioned to cooperate with said abutment to limit the lowering of said conduit, a pin extending laterally from said lever, power means normally bearing against said pin and biased to hold said conduit in its raised position when deenergized but movable away from said pin when energized to cause lowering of said conduit, and liquid flow initiating means cooperating with said conduit to normally hold said conduit independently of said power means in a raised no-flow position but movable to cause lowering of said conduit and to initiate liquid flow through said conduit provided said power means is energized.

ALEX J. BIELSKI.

REFERENCES CITED

The following references are of record in the file of this patent:

UNITED STATES PATENTS

| Number | Name | Date |
| --- | --- | --- |
| 1,211,523 | Anderson | Jan. 9, 1917 |
| 1,627,451 | Palmer | May 3, 1927 |
| 1,970,880 | Bird | Aug. 21, 1934 |
| 2,129,937 | Johnson | Sept. 3, 1938 |
| 2,139,616 | Foulds | Dec. 6, 1938 |
| 2,241,327 | Selby | May 6, 1941 |
| 2,269,848 | French | Jan. 13, 1942 |
| 2,273,205 | Kommer | Feb. 17, 1942 |
| 2,303,235 | Seldon | Nov. 24, 1942 |
| 2,317,556 | Russel | Apr. 27, 1943 |
| 2,346,817 | Breese | Apr. 18, 1944 |